US009516582B2

(12) United States Patent
Akgul et al.

(10) Patent No.: US 9,516,582 B2
(45) Date of Patent: Dec. 6, 2016

(54) ADAPTIVE ACCESS POINT DATABASE MANAGEMENT

(71) Applicant: QUALCOMM Incorporated, San Diego, CA (US)

(72) Inventors: Ferit Ozan Akgul, San Jose, CA (US); Weihua Gao, San Jose, CA (US); David Richard Coleman, San Jose, CA (US); Bruce Everett Wilson, Palo Alto, CA (US)

(73) Assignee: QUALCOMM Incorporated, San Diego, CA (US)

(*) Notice: Subject to any disclaimer, the term of this patent is extended or adjusted under 35 U.S.C. 154(b) by 418 days.

(21) Appl. No.: 13/784,391

(22) Filed: Mar. 4, 2013

(65) Prior Publication Data
US 2014/0029468 A1   Jan. 30, 2014

Related U.S. Application Data

(60) Provisional application No. 61/677,397, filed on Jul. 30, 2012.

(51) Int. Cl.
*H04W 48/14* (2009.01)
*H04W 4/02* (2009.01)

(52) U.S. Cl.
CPC ............. *H04W 48/14* (2013.01); *H04W 4/021* (2013.01)

(58) Field of Classification Search
CPC .................... H04W 4/021; H04W 48/14
USPC .............................. 370/254, 238
See application file for complete search history.

(56) References Cited

U.S. PATENT DOCUMENTS

| 7,483,984 | B1 | 1/2009 | Jonker et al. |
| 7,835,769 | B2 | 11/2010 | Gustaf |
| 8,081,957 | B2 | 12/2011 | O'neil |
| 2008/0176583 | A1 | 7/2008 | Brachet et al. |
| 2010/0082526 | A1 | 4/2010 | Wassingbo |
| 2010/0165928 | A1 | 7/2010 | Chen et al. |
| 2011/0256881 | A1 | 10/2011 | Huang et al. |
| 2011/0286437 | A1* | 11/2011 | Austin et al. ............... 370/338 |

FOREIGN PATENT DOCUMENTS

EP       2262288 A1    12/2010

OTHER PUBLICATIONS

International Search Report and Written Opinion—PCT/US2013/050939—ISA/EPO—Nov. 21, 2013.

* cited by examiner

*Primary Examiner* — Andrew Lai
*Assistant Examiner* — Albert Shih
(74) *Attorney, Agent, or Firm* — Silicon Valley Patent Group LLP

(57) ABSTRACT

Method and system for providing information of an access point database are disclosed. In one embodiment, a method of providing information of an access point database comprises receiving a request to access an access point database from a mobile client, generating a segment of the access point database in accordance with at least an application requirement of the mobile client, and providing the segment of the access point database to the mobile client. The application requirement of the mobile client comprises precision level requested by the mobile client, and cache level of the mobile client. The method of generating a segment of the access point database comprises at least one of: generating the segment of the access point database in real-time, and providing the segment of the access point database previously generated and stored in the access point database.

34 Claims, 5 Drawing Sheets

ADAPTIVE ACCESS POINT DATABASE MANAGEMENT

CROSS REFERENCE TO RELATED APPLICATIONS

This application claims the benefit of U.S. provisional application No. 61/677,397, entitled "Adaptive Access Point Database Management" filed Jul. 30, 2012. The aforementioned United States application is hereby incorporated by reference in its entirety.

FIELD

The present disclosure relates to the field of wireless communications. In particular, the present disclosure relates to method and system for providing information of an access point database.

BACKGROUND

Obtaining information from WiFi access point (AP) databases can benefit positioning and navigation applications. In conventional approaches, information about the AP database requested may be provided to mobile clients without taking into account the requirements and capabilities of the mobile clients performing the positioning and navigation applications. In addition, in conventional approaches for building and maintaining the WiFi AP databases, a crowdsourcing server would periodically send instructions to all crowdsourcing mobile clients instructing them how to collect crowdsourcing data without taking into account the environment of the mobile clients. As a result, in some cases, excessive data may be sent to the mobile clients, which not only may waste valuable bandwidth and battery, it may also consume limited data storage space of the mobile clients. In some other cases, insufficient data may be sent to the mobile clients, which may adversely impact the user experience with the positioning and navigation applications. In yet some other cases, the mobile clients may upload excessive redundant crowdsourcing data to the server, which may cause the server to consume additional resources to search and extract useful data from the mobile clients.

Therefore, there is a need for methods and systems that can address the above issues of conventional solutions.

SUMMARY

The present disclosure relates to methods and systems for providing information of an access point database. In one embodiment, a method of providing information of an access point database comprises receiving a request to access an access point database from a mobile client, generating a segment of the access point database in accordance with at least an application requirement of the mobile client, and providing the segment of the access point database to the mobile client. The application requirement of the mobile client comprises precision level requested by the mobile client, and cache level of the mobile client. The method of generating a segment of the access point database comprises at least one of: generating the segment of the access point database in real-time, and providing the segment of the access point database previously generated and stored in the access point database.

In another embodiment, an apparatus comprises at least one processor that includes logic configured to receive a request to access an access point database from a mobile client, logic configured to generate a segment of the access point database in accordance with at least an application requirement of the mobile client, and logic configured to provide the segment of the access point database to the mobile client. The application requirement of the mobile client comprises precision level requested by the mobile client, and cache level of the mobile client.

The logic configured to generate a segment of the access point database comprises at least one of: logic configured to generate the segment of the access point database in real-time, and logic configured to provide the segment of the access point database previously generated and stored in the access point database.

The logic configured to generate a segment of the access point database further comprises at least one of: logic configured to reduce size of the segment of the access point database in accordance with density of access points in a geographical area the mobile client is located, logic configured to reduce size of the segment of the access point database in accordance with building morphology of the geographical area the mobile client is located, logic configured to reduce size of the segment of the access point database in accordance with popularity of one or more access points in the geographical area the mobile client is located, and logic configured to reduce size of the segment of the access point database in accordance with maximum antenna range field of one or more access points in the geographical area the mobile client is located.

The logic configured to reduce size of the segment of the access point database in accordance with density of access points comprises logic configured to determine a number of access points in the geographical area the mobile client is located, and logic configured to reduce the number of access points based at least in part on a predetermined reduction factor. The logic configured to reduce size of the segment of the access point database in accordance with building morphology of the geographical area comprises at least one of: logic configured to obtain density of buildings in the geographical area the mobile client is located and reduce the number of access points based at least in part on the density of buildings in the geographical area; logic configured to obtain height of a building the mobile client is located and reduce the number of access points based at least in part on the height of the building; and logic configured to obtain altitude information of a plurality of access points in the building and maintain access point distribution in accordance with the altitude information. The logic configured to reduce size of the segment of the access point database in accordance with popularity of one or more access points in the geographical area comprises logic configured to assign a score to each of the one or more access points in accordance with usage of the one or more access points by mobile clients in the geographical area, and logic configured to maintain a number of access points based at least in part on the score of each of the one or more access points. The logic configured to reduce size of the segment of the access point database in accordance with maximum antenna range field of one or more access points in the geographical area comprises logic configured to reduce access points based at least in part on a predefined ratio of access points having large, medium, and small values of maximum antenna ranges.

The logic configured to generate a segment of the access point database in accordance with at least an application requirement of the mobile client further comprises logic configured to reduce size of the segment of the access point database by adaptively controlling crowdsourcing data uploaded from mobile clients. The logic configured to adaptively control crowdsourcing data uploaded from mobile clients comprises logic configured to control amount of crowdsourcing data uploaded based at least in part on number of access points in a geographical area the mobile client is located. The logic configured to adaptively control crowdsourcing data uploaded from mobile clients further comprises logic configured to control amount of crowdsourcing data uploaded based at least in part on maximum antenna ranges of access points in a geographical area the mobile client is located.

In yet another embodiment, a computer program product comprises a non-transitory medium storing computer programs for execution by one or more computer systems. The computer program product further comprises code for receiving a request to access an access point database from a mobile client, code for generating a segment of the access point database in accordance with at least an application requirement of the mobile client, and code for providing the segment of the access point database to the mobile client.

In yet another embodiment, a system for providing information of an access point database comprises means for receiving a request to access an access point database from a mobile client, means for generating a segment of the access point database in accordance with at least an application requirement of the mobile client, and means for providing the segment of the access point database to the mobile client.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

Like numbers are used throughout the specification.

DESCRIPTION OF EMBODIMENTS

Figure 1:
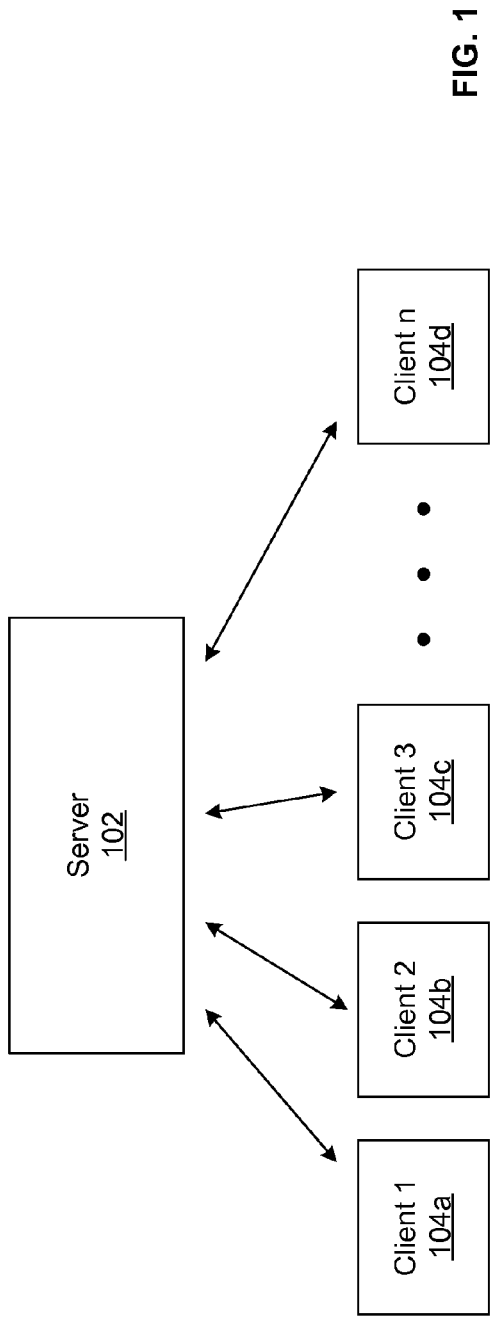
FIG. 1 illustrates an exemplary client-server application environment according to some aspects of the present disclosure.

Embodiments of providing information of an access point (AP) database (DB) are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Many urban positioning systems use a client-server architecture where clients may request position determination from a server based on observed APs. After receiving a request from a client, a server may respond with information from the access point database that carry information about the access points found in a geographical region of interest to assist the client to perform position determination. Different levels of location precision may be desired based on capabilities and application requirements of the client. The server may respond to the different levels of location precision with different AP database segment sizes.

According to aspects of the present disclosure, an AP DB segment describes information of one or more access points that may be found in a geographical area. In some implementations, the geographical area may be referred to as a tile represented by a one kilometer (KM) by one kilometer square. In other implementations, the geographical area may be identified as a 2 KM by 2 KM tile, or other tile sizes that may be deem appropriate for the area. Note that although a tile is described as a square for simplicity of illustration in various examples shown herein, according to aspects of the present disclosure, a tile may take any shape or form, such as hexagon or rectangle, to represent a unit of geographical area. In some implementations, an AP DB segment for an 1 KM by 1 KM tile of a suburban area may range from several kilobytes to 1 megabytes (MB); and an AP DB segment for an 1 KM by 1 KM tile of a metropolitan area may range from 1 MB to 5 MB.

Adjustment of AP DB segment sizes for different geographical areas, for example dense areas, can be beneficial to prevent traffic surge in these areas and to allow clients to hold sufficient information about surrounding APs using limited amount of memory. Systems and methods to decrease the sizes of AP DB segments that are stored on the server whilst maintaining sufficient position determination performance are described below. According to some aspects of the present disclosure, AP DB segment size reduction or adjustment may be accomplished through methods of adaptive crowdsourcing data processing and reporting.

In some implementations, a server may be configured to perform AP DB segment size reduction based at least in part on, but not limited to: a) geographical density based reduction; b) building morphology based reduction; c) AP popularity based reduction; and/or d) AP maximum antenna range (MAR) based reduction.

In some other implementations, adaptive crowdsourcing may be performed to keep the segment of AP DB sizes manageable at the server by using a low level of crowdsourcing in dense AP DB segments, and/or by using an AP footprint based crowdsourcing.

In one exemplary implementation, AP DB segment size reduction can be performed in real-time at the server according to specific client applications used by a client. For example, a client may send to the server an indication of low location precision requirement. Based on this client application requirement, the server may employ a low level of crowdsourcing to generate a segment of the AP DB for the client. As a result, the method enables a faster transaction and more efficient cache management at the client. On the other hand, some client applications may require a high location precision. In response, the client may send to the server an indication of high location precision requirement. Based on this client application requirement, the server may employ a high level of crowdsourcing to generate a segment of the AP DB for the client.

FIG. 1 illustrates an exemplary client-server application environment according to some aspects of the present disclosure. According to aspects of the present disclosure, a client may also be referred to as a mobile client or mobile station. As shown in FIG. 1, server 102 may be configured to provide AP database segments to one or more clients based at least in part on application requirement of the one or more clients. For example, client 1 (104a) may represent a device that runs applications using low precision location. In response, the server 102 may send AP DB segments that may be size-reduced at a high level (e.g. size-reduced by 80%). Client 2 (104b) may represent a device that runs applications using mid-level precision location. In response, the server 102 may send AP DB segments that may be size-reduced at a medium level (e.g. size-reduced by 50%). Client 3 (104c) may represent a device that runs applications using high-level precision, but its cache size may not support large AP DB segments. In response, the server may send AP DB segments that may be size-reduced at a medium level (e.g. size-reduced by 50%). Client n (104d) may represent a device that runs applications using high precision location and it has enough cache size. In response, the server may send AP DB segments whose sizes may not be reduced at all (e.g. size-reduced by 0%). According to aspects of the present disclosure, server 102 may be configured to generate a segment of the access point database in accordance with at least an application requirement of the mobile client. The application requirement of the mobile client may include, but not limited to: precision level requested by the mobile client, cache level of the mobile client, battery level of the mobile client, and/or type of processor(s) used in the mobile client.

Figure 2A:
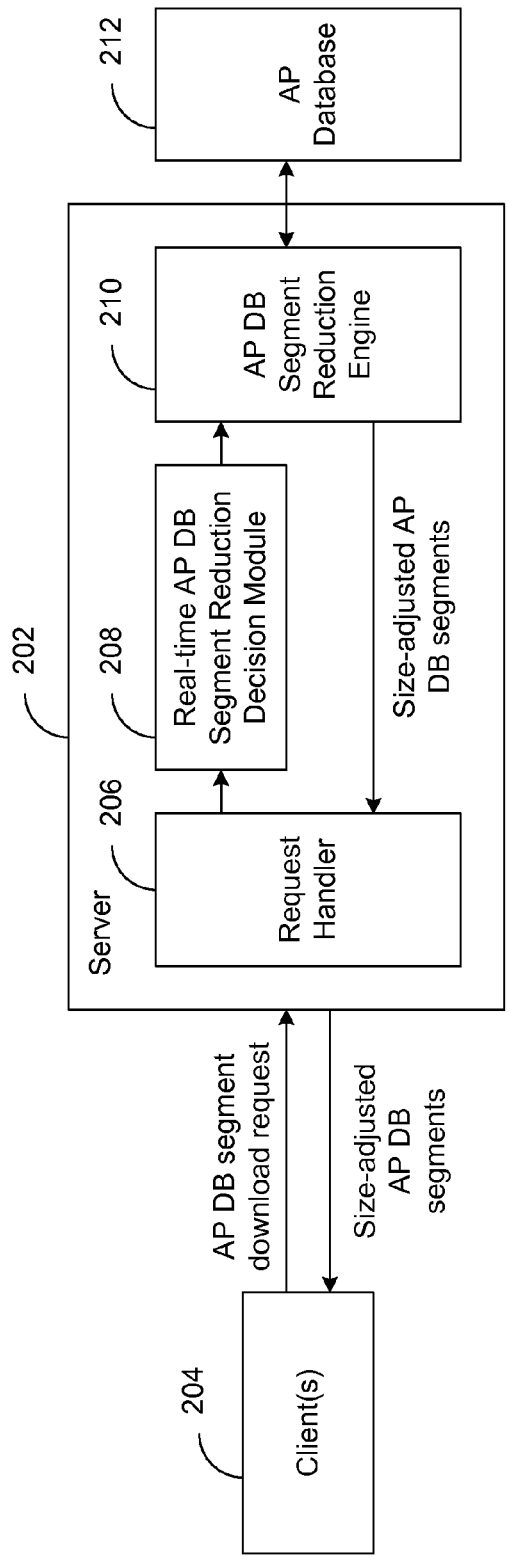
FIG. 2A illustrates a method of providing an access point database segment to a mobile client according to some aspects of the present disclosure.

According to embodiments of the present disclosure, AP DB segment size reduction may be performed in real-time or through offline processing. FIG. 2A illustrates a method of providing an AP DB segment to a client according to some aspects of the present disclosure. In the example shown in FIG. 2A, server 202 includes a request handler 206, a real-time AP DB segment reduction decision module 208, and an AP DB segment reduction engine 210. The server 202 may be configured to communicate with an AP database 212, which may be located internal or external to the server 202. In one implementation, the request handler 206 may receive a request for an AP DB segment from a client 204, where the request may include a specific location precision required and available cache size of the client 204. The request may in addition or instead include other client information, such as in the form of the client status data. Further, the client information may be received separately from the request in some embodiments. The real-time AP DB segment reduction decision module 208 may be configured to determine the amount of reduction it may apply to the AP DB segment in real-time. The AP DB segment reduction engine 210 then applies one or more AP DB segment reduction methods to achieve the amount of data size reduction/adjustment for the client 204. The request handler 206 then sends the size-reduced (or size-adjusted) AP DB segments to the client 204.

Figure 2B:
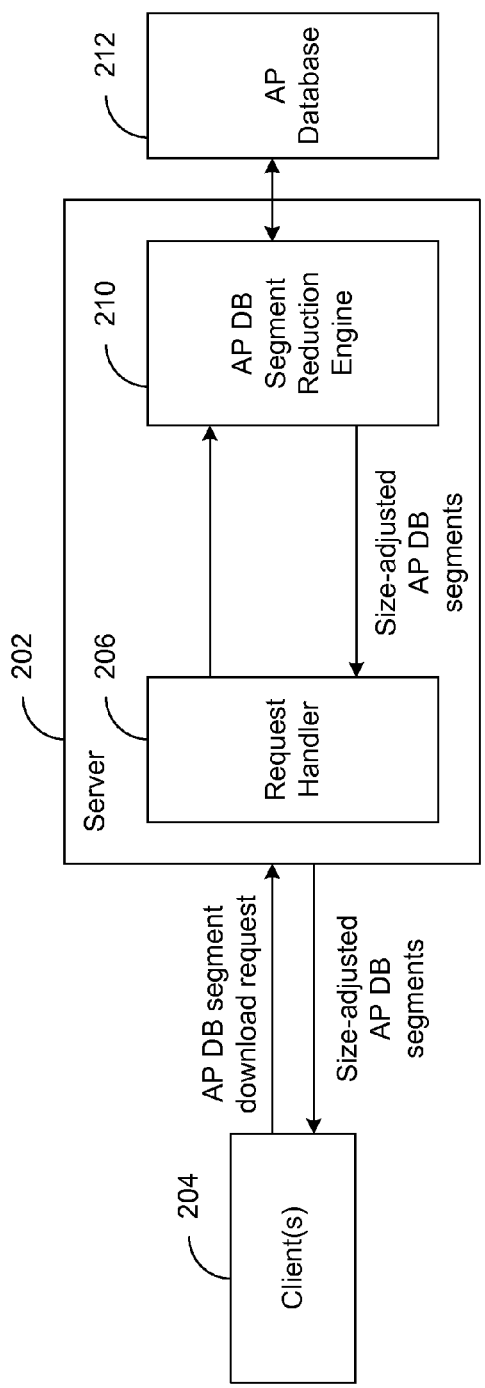
FIG. 2B illustrates another method of providing an access point database segment to a mobile client according to some aspects of the present disclosure.

FIG. 2B illustrates another method of providing an AP DB segment to a mobile client according to some aspects of the present disclosure. In the example shown in FIG. 2B, server 202 includes a request handler 206 and an AP DB segment reduction engine 210. The server 202 may be configured to communicate with an AP database 212, which may be located internal or external to the server. In one implementation, the request handler 206 may receive a request for an AP DB segment from a client 204, where the request may include a specific location precision required and available cache size of the client. The AP DB segment reduction engine 210 may select an appropriate AP DB segment from the AP database 212. The request handler 206 then sends the size-reduced (or size-adjusted) AP DB segments to the client 204.

Note that in the case described in FIG. 2B, the size of the segment of AP DB selected may have been reduced previously. The AP database 212 may keep multiple versions of such segments of AP DB with various reduction levels for a certain geographical area and hence can send the appropriate one to client 204 when a request is received.

According to aspects of the present disclosure, the AP DB segment reduction engine 210 of the server 202 may employ various methods to reduce the size of an AP DB segment to meet the requirements of a client 204. In one approach, the AP DB segment reduction engine 210 may perform a geographical density based reduction. In this method, an AP DB segment may be subdivided into smaller sub-AP DB segments. Number of APs in each sub-AP DB segment can be determined and AP reduction can be performed based on a predetermined total reduction factor (for example 25%, 50%, 75%, etc.) sent by AP DB segment reduction decision module. This method ensures the data reduction may be based on density of APs in a certain segments of AP DB; thus more APs may be deleted in more dense regions and less APs may be deleted in less dense regions.

In another approach, the AP DB segment reduction engine 210 may perform a building morphology based reduction. In this method, density of buildings in a geographical area and building height information, which can be obtained through various sources, may be used to determine the size reduction for a specific area. For example, if many APs exist in a tall building (e.g. more than 50 meters tall) in an AP DB segment, less reduction may be performed since existence of this tall building may justify the number of APs. If, however, many APs exist in a shorter building (e.g. less than 10 meters tall), more AP reduction may be performed since this specific area may be over represented. In addition, if AP altitude information is available, an even AP distribution may be maintained based on the AP altitude information.

In yet another approach, the AP DB segment reduction engine 210 may perform an AP popularity based reduction. In this method, a score may be assigned to an AP based on a number of times the AP has been used in location requests and the number of times the AP has been downloaded. These scores can be used to determine the APs to be removed when reduction is performed. For example, if an AP is not popular, for example less than a predetermined threshold of requests (e.g. less than 3 requests), it may be removed from the segment of AP DB. On the other hand, a more popular AP, for example more than a predetermined threshold of requests (e.g. more than 20 requests), may be kept in the segment of AP DB.

In yet another approach, the AP DB segment reduction engine 210 may perform an AP MAR based reduction. In this method, AP MAR field may be used to determine the APs to be removed from the segment of AP DB. In order to cover an area and to avoid coverage holes, a certain percentage of large MAR APs may be used, however these APs may not provide desired positioning performance. Hence in order to have desired positioning performance, APs with medium and small MAR may also be used. Based on a predefined set of percentage values for these large/medium/small MARs, the server 202 can remove APs from the segment of AP DBs. For example, if a predefined set is (20%/20%/60%), and if the total percentage of large MAR APs is 40, the server 202 may remove APs with large MAR until their total percentage can be down to 20.

Figure 2C:
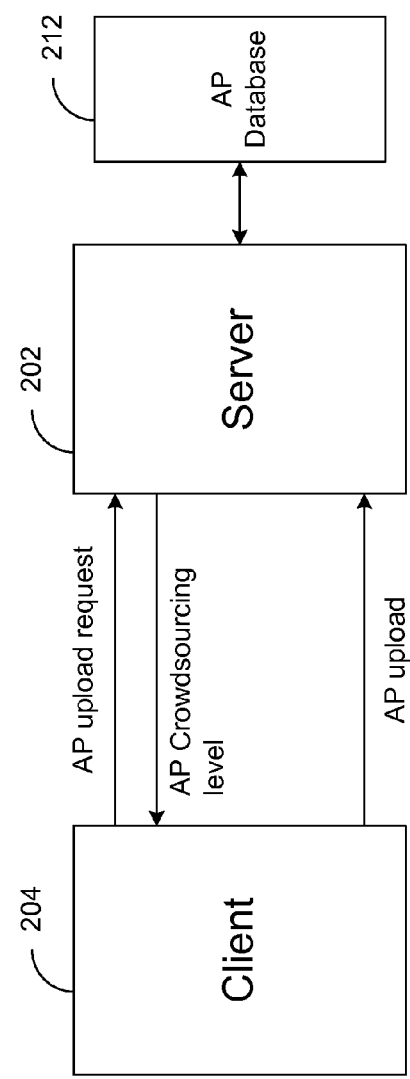
FIG. 2C illustrates a method of controlling crowdsourcing data for upload according to some aspects of the present disclosure.

FIG. 2C illustrates a method of controlling crowdsourcing data for upload according to some aspects of the present disclosure. In the example shown in FIG. 2C, server 202 may be configured to adaptively control one or more client(s) 204 to reduce the amount of crowdsourcing data uploaded to the server. For example, when server 202 receives an AP upload request from client 204, the server 202 may instruct the client 204 to upload data based on the current region the client 204 is performing the crowdsourcing. In this way, the server 202 may control the amount of data uploaded based on the maturity of data in a given geographical region. If a region has many APs, a low level of crowdsourcing may be employed for this region. As a result, the number of uploads may be performed less frequently and each upload may transmit fewer amount of data.

In the descriptions herein, various examples of crowdsourcing levels are provided for illustration purposes. In some examples, a crowdsourcing level 1 (in a scale of 1 to 10) may be considered as a low level of crowdsourcing (i.e. crowdsourcing less) may be performed. A crowdsourcing level 5 (in a scale of 1 to 10) may be considered as a medium level of crowdsourcing may be performed. A crowdsourcing level 10 (in a scale of 1 to 10) may be considered as a high level of crowdsourcing (i.e. crowdsourcing more) may be performed. There may be various crowdsourcing levels, such as 2 to 9, that represent different efforts of crowdsourcing between level 1 and level 10 (in a scale of 1 to 10). According to aspects of the present disclosure, other crowdsourcing levels, such as 1 through 5 or 1 through 100, may be used. The variations in crowdsourcing levels may be adjusted by, including but not limited to: 1) quantity of crowdsourcing data to be collected by the mobile client; 2) frequency of crowdsourcing operations to be performed by the mobile client; and 3) type of quantization to be applied to the crowdsourcing data collected.

The table below illustrates exemplary parameters of crowdsourcing levels. In this example, data age and AP count may be used to determine what type of crowdsourcing level may be applied. For instance, if the AP count is higher than 500 and the data is less than 2 weeks old, a low level of crowdsourcing may be adopted.

| Data Age (days) | AP Count <= 100 | 100 < AP Count < 500 | AP Count > 500 |
|---|---|---|---|
| Age > 30 | High level | High level | Medium level |
| 15 < Age <= 30 | High level | Medium level | Low level |
| Age <= 15 | Medium level | Low level | Low level |

In some other implementations, the server 202 may control the crowdsourcing data based at least in part on AP footprint. In this approach, the server 202 may instruct the client(s) 204 to upload APs with larger MARs if the area has coverage holes. If, on the other hand, a region has less number of small MAR APs which are used for higher location precision, the server 202 may instruct the client(s) 204 to upload small MAR APs more. This control may be provided in the AP upload type configuration sending from the server to the client.

According to aspects of the present disclosure, a mobile client may select observations to be included in the data upload using a combination of: 1) random selection based on ratio of MNoO (Maximum number of observations) to remaining unprocessed observations; 2) similarity between scan lists; and 3) comparison of HEPE values to select between similar scan lists.

Figure 3:
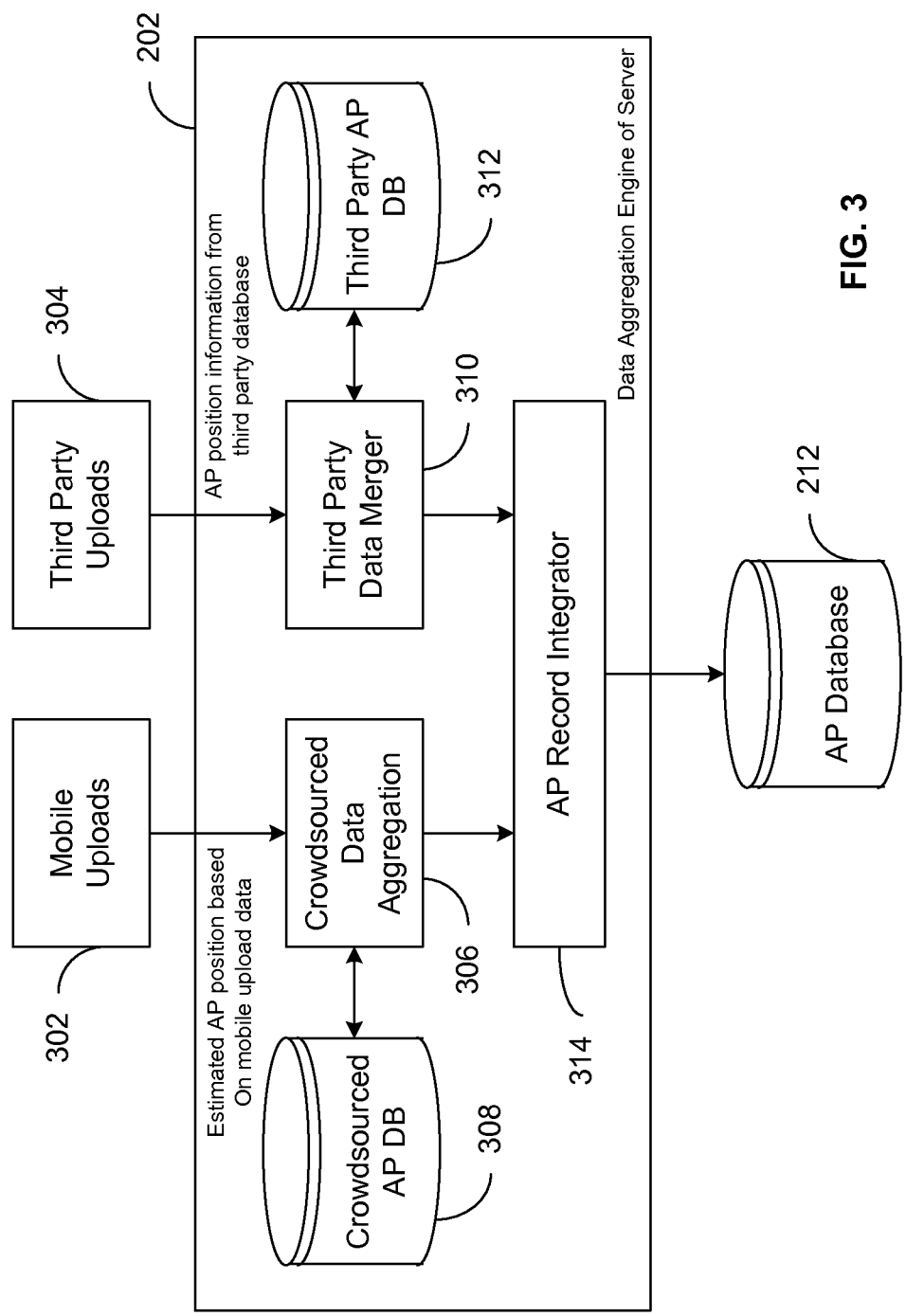
FIG. 3 illustrates a block diagram of an exemplary data aggregation engine of a server according to some aspects of the present disclosure.

FIG. 3 illustrates a block diagram of an exemplary data aggregation engine of a server according to some aspects of the present disclosure. In the example shown in FIG. 3, a data aggregation engine of server 202 includes crowdsourced data aggregation 306, crowdsourced AP database 308, third party data merger 310, third party AP database 312, and AP record integrator 314. The crowdsourced data aggregation block 306 receives AP position information from mobile uploads 302 and stores the data in the crowdsourced AP database 308. Similarly, the third party data merger 310 receives AP position information from third party uploads 304 and stores the data in the third party AP database 312. The AP record integrator 314 receives data from both the crowdsourced data aggregation block 306 and the third party data merger 310 and stores the integrated data in AP database 212.

According to aspects of the present disclosure, the data accumulation process may be based on time limit and number of measurements. Various time limits on raw data may be implemented. In one exemplary implementation, the data accumulation process checks incoming mobile upload data with periodicity of a predetermined period (e.g. 1 hour, 6 hours, 12 hours, 1 day, etc.). Next, the process quantizes latitude and longitude of reported mobile position to approximate 0.0001 degree (10 m). The quantization resolution (i.e. the size of grids) can be configurable and can be adjusted depending on upload data density. For each mobile fix, the data accumulation process checks if the quantized grid is occupied. If occupied, the process puts the fix into this grid's measurement record, and increases this grid's number of measurement. Alternatively, the process adds this mobile fix to this grid's record (grid's number of measurement is incremented by 1) and increases the number of accumulated unique grids (numUniqueGrids) of this AP. Then, the process adds this AP to the aggregation AP list if sufficient data is accumulated (for example numUniqueGrids>=3). Next, the process adds the AP to the aggregation AP list if there is no sufficient data, but a predetermined maximum accumulation time is reached (for example 14 days). Last but not least, if the aggregation AP list is not empty, the process makes an aggregation request to aggregate data with the aggregation AP list.

According to aspects of the present disclosure, the third party data merger 310 can be configured to update the third party AP DB 312 when there are multiple injections of third party AP data, whether such data are received from the same provider or different providers. In the event of the multiple third party data injections are from the same provider, then the old data may be replaced by the new data. If the multiple third party data injections are from different providers, the third party data merger can be configured to choose a database as the primary database, and the other databases may be compared to the primary database. If a new AP record is found in other databases, that AP record can be added to the primary database. In some implementations, when the multiple third party databases have a unified reliability level metric on each of their AP records, the AP record that has the highest reliability level may be selected by the third party data merger 310 and put into the third party AP DB 312.

According to aspects of the present disclosure, the crowdsourced data aggregation 306 and the third party data merger 310 can be two parallel operations. At the end of each operation process, the result can be saved in their own database respectively. The results from both operations can be combined by the AP record integrator 314. Note that the estimation result from the data aggregation engine of server 202 may be a combined result.

In some implementations, the AP record integrator 314 may be configured to perform the following tasks. First, the AP record integrator 314 can be configured to estimate the integrated result using crowdsourced data made available to the AP record integrator 314 when the data aggregation engine is publishing the integrated result. AP position records based on third party database may be made available to the AP record integrator 314 after the data has been provided by a third party. Note that initially, when there is no AP estimation result based on crowdsourcing available, third party database's AP records may be cached in the AP record integrator 314 and then stored in the AP Database 212. If there is no record for an AP in third party database 312, but the crowdsourced data aggregation block 306 has the AP's estimation result, then the AP record integrator may be configured to use results from the crowdsourced data aggregation block. If results from both third party database 312 and the crowdsourced AP DB 308 are available, the AP record integrator 314 may be configured to choose results from the crowdsourced AP DB 308 through the crowdsourced data aggregation block 306.

Figure 4:
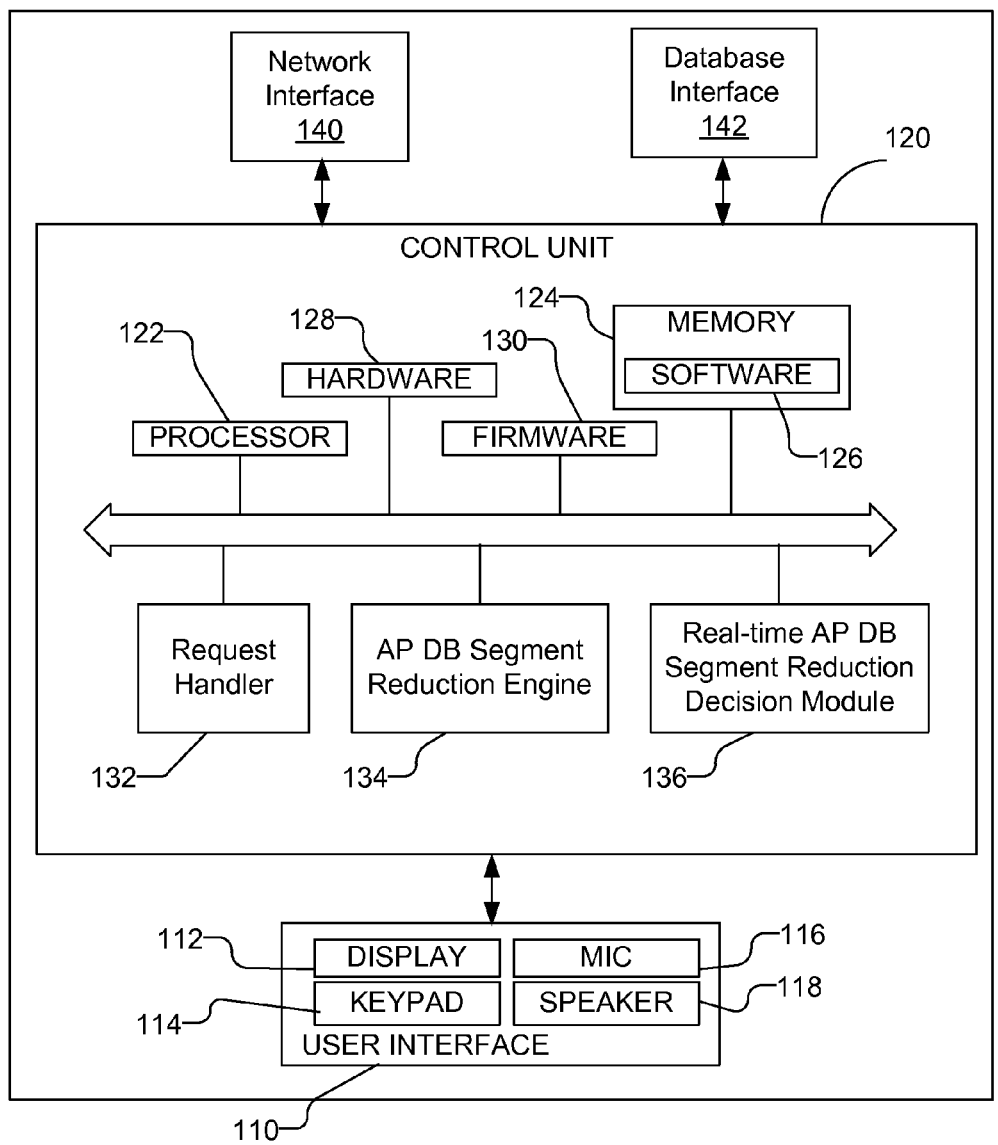
FIG. 4 illustrates a block diagram of an exemplary access point database management server according to some aspects of the present disclosure.

According to aspects of the present disclosure, the functions described in FIGS. 2A-2C, FIG. 3 and FIG. 5 may be implemented by the server of FIG. 4. In some implementations, the functions may be performed by processor(s), software, hardware, and firmware, or a combination of these blocks to perform various functions of the server described herein, including the functions performed by the request handler 206, the real-time AP DB segment reduction decision module 208, and the AP DB segment reduction engine 210.

FIG. 4 illustrates a block diagram of an exemplary access point database management server according to some aspects of the present disclosure. The platform of the AP DB management server 202 includes a network interface 140 for communicating with mobile client devices, where the network interface may be configured to interface with wired and/or wireless networks. The platform of the AP DB management server 202 may also include database interface 142, which may be used to communicate with internal and/or external databases.

The platform of the AP DB management server 202 may also include a user interface 110 that includes display 112 capable of displaying images. The user interface 110 may also include a keypad 114 or other input device through which the user can input information into the AP DB management server 202. If desired, the keypad 114 may be obviated by integrating a virtual keypad into the display 112 with a touch sensor. The user interface 110 may also include a microphone 116 and one or more speakers 118, for example. Of course, the platform of the AP DB management server 202 may include other components unrelated to the present disclosure.

The platform of the AP DB management server 202 further includes a control unit 120 that is connected to and communicates with the network interface 140, the database interface 142, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a request handler 132, an AP DB segment reduction engine 134, and a real-time AP DB segment reduction decision module 136. The request handler 132, AP DB segment reduction engine 134, and real-time AP DB segment reduction decision module 136 are illustrated separately from processor 122 and/or hardware 128 for clarity, but may be combined and/or implemented in the processor 122 and/or hardware 128 based on instructions in the software 126 and the firmware 130.

Figure 5:
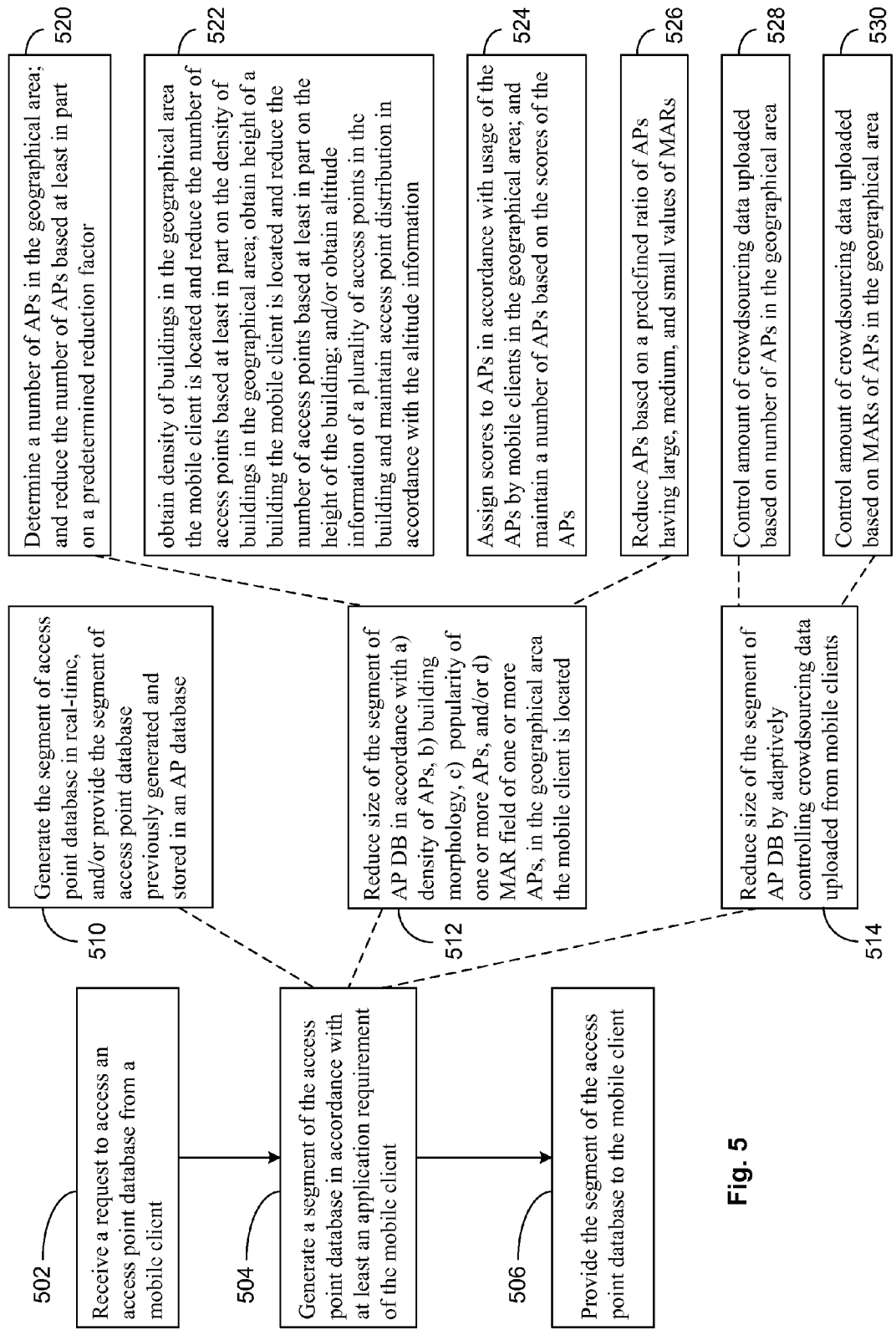
FIG. 5 illustrates a method of providing information of an access point database according to some aspects of the present disclosure.

FIG. 5 illustrates a flow diagram for providing size-reduced AP DB segments from a server to a client according to some aspects of the present disclosure. As shown in FIG. 5, in block 502, the method receives a request for information of an access point database from a mobile client. In block 504, the method generates a segment of the access point database in accordance with at least an application requirement of the mobile client. In block 506, the method provides the segment of the access point database to the mobile client. Note that the at least an application requirement of the mobile client includes precision level requested by the mobile client, and cache level of the mobile client.

According to embodiments of the present disclosure, the methods performed in block 504 may further include methods performed in blocks 510, 512, and 514. For example, in block 510, the method may generate the segment of the access point database in real-time. Alternatively, the method may provide the segment of the access point database previously generated and stored in the access point database. In block 512, the method may perform at least one of: reduce size of the segment of the access point database in accordance with density of access points in a geographical area the mobile client is located; reduce size of the segment of the access point database in accordance with building morphology of the geographical area the mobile client is located; reduce size of the segment of the access point database in accordance with popularity of one or more access points in the geographical area the mobile client is located; and reduce size of the segment of the access point database in accordance with maximum antenna range field of one or more access points in the geographical area the mobile client is located. In block 514, the method reduces size of the segment of the access point database by adaptively controlling crowdsourcing data uploaded from mobile clients.

The methods performed in block 512 may further include methods performed in blocks 520 to 526. In block 520, the method determines a number of access points in the geographical area the mobile client is located, and reduces the number of access points based at least in part on a predetermined reduction factor.

In block 522, the method obtains density of buildings in the geographical area the mobile client is located and reduces the number of access points based at least in part on the density of buildings in the geographical area; obtains height of a building the mobile client is located and reduces the number of access points based at least in part on the height of the building; and/or obtains altitude information of a plurality of access points in the building and maintains access point distribution in accordance with the altitude information of the plurality of access points in the building.

In block 524, the method assigns a score to each of the one or more access points in accordance with usage of the one or more access points by mobile clients in the geographical area, and maintains a number of access points based at least in part on the score of each of the one or more access points.

In block 526, the method reduces access points based at least in part on a predefined ratio of access points having large, medium, and small values of maximum antenna ranges.

The methods performed in block 514 may further include methods performed in blocks 528 and 530. For example, in block 528, the method controls amount of crowdsourcing data uploaded based at least in part on number of access points in the geographical area. In block 530, the method controls amount of crowdsourcing data uploaded based at least in part on maximum antenna ranges of access points in the geographical area.

According to aspects of the present disclosure, one of the benefits of the disclosed system is that it can be configured to provide efficient delivery of AP data to mobile clients over the data network. Another benefit of the system is that it can be scalable and be configured to support millions of users while reducing impact to data handling capacity of the network. Furthermore, the system can be configured to conserve battery life as well as allow mobile clients to efficiently manage their memory resources.

Note that at least the following three paragraphs, FIGS. 1-5 and their corresponding descriptions provide means for receiving a request to access an access point database from a mobile client, means for generating a segment of the access point database in accordance with at least an application requirement of the mobile client, and means for providing the segment of the access point database to the mobile client. The following three paragraphs, FIGS. 1-5 and their corresponding descriptions further provide means for generating the segment of the access point database in real-time; means for providing the segment of the access point database previously generated and stored in the access point database; means for reducing size of the segment of the access point database in accordance with density of access points in a geographical area the mobile client is located; means for reducing size of the segment of the access point database in accordance with building morphology of the geographical area the mobile client is located; means for reducing size of the segment of the access point database in accordance with popularity of one or more access points in the geographical area the mobile client is located; means for reducing size of the segment of the access point database in accordance with maximum antenna range field of one or more access points in the geographical area the mobile client is located; and means for reducing size of the segment of the access point database by adaptively controlling crowdsourcing data uploaded from mobile clients.

The methodologies and mobile client/device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of providing information of an access point database, comprising:
   receiving a request to access the access point database from a mobile client;
   generating a segment of the access point database in accordance with at least an application requirement of the mobile client, wherein the application requirement of the mobile client comprises a precision level requested by the mobile client and a cache level of the mobile client, and wherein the precision level requested by the mobile client and the cache level of the mobile client indicate capabilities of the mobile client in running applications based on the segment of the access point database; and
   providing the segment of the access point database to the mobile client.

2. The method of claim 1, wherein generating the segment of the access point database comprises at least one of:
   generating the segment of the access point database in real-time; and
   providing the segment of the access point database previously generated and stored in the access point database.

3. The method of claim 1, wherein generating the segment of the access point database further comprises at least one of:
   reducing size of the segment of the access point database in accordance with density of access points in a geographical area the mobile client is located;
   reducing size of the segment of the access point database in accordance with building morphology of the geographical area the mobile client is located;
   reducing size of the segment of the access point database in accordance with popularity of one or more access points in the geographical area the mobile client is located; and
   reducing size of the segment of the access point database in accordance with maximum antenna range field of one or more access points in the geographical area the mobile client is located.

4. The method of claim 3, wherein reducing size of the segment of the access point database in accordance with density of access points comprises:
   determining a number of access points in the geographical area the mobile client is located; and
   reducing the number of access points based at least in part on a predetermined reduction factor.

5. The method of claim 3, wherein reducing size of the segment of the access point database in accordance with building morphology of the geographical area comprises at least one of:
   obtaining density of buildings in the geographical area the mobile client is located and reducing the number of access points based at least in part on the density of buildings in the geographical area;
   obtaining height of a building the mobile client is located and reducing the number of access points based at least in part on the height of the building; and
   obtaining altitude information of a plurality of access points in the building and maintaining access point distribution in accordance with the altitude information.

6. The method of claim 3, wherein reducing size of the segment of the access point database in accordance with popularity of one or more access points in the geographical area comprises:

assigning a score to each of the one or more access points in accordance with usage of the one or more access points by mobile clients in the geographical area; and
maintaining a number of access points based at least in part on the score of each of the one or more access points.

7. The method of claim 3, wherein reducing size of the segment of the access point database in accordance with maximum antenna range field of one or more access points in the geographical area comprises:
reducing access points based at least in part on a predefined ratio of access points having large, medium, and small values of maximum antenna ranges.

8. The method of claim 1, wherein generating the segment of the access point database in accordance with at least an application requirement of the mobile client further comprises:
reducing size of the segment of the access point database by adaptively controlling crowdsourcing data uploaded from mobile clients.

9. The method of claim 8, wherein adaptively controlling crowdsourcing data uploaded from mobile clients comprises:
controlling amount of crowdsourcing data uploaded based at least in part on number of access points in a geographical area the mobile client is located.

10. The method of claim 8, wherein adaptively controlling crowdsourcing data uploaded from mobile clients further comprises:
controlling amount of crowdsourcing data uploaded based at least in part on maximum antenna ranges of access points in a geographical area the mobile client is located.

11. An apparatus, comprising:
at least one processor, wherein the at least one processor comprises
logic configured to receive a request to access an access point database from a mobile client;
logic configured to generate a segment of the access point database in accordance with at least an application requirement of the mobile client, wherein the application requirement of the mobile client comprises a precision level requested by the mobile client and a cache level of the mobile client, and wherein the precision level requested by the mobile client and the cache level of the mobile client indicate capabilities of the mobile client in running applications based on the segment of the access point database; and
logic configured to provide the segment of the access point database to the mobile client.

12. The apparatus of claim 11, wherein logic configured to generate the segment of the access point database comprises at least one of:
logic configured to generate the segment of the access point database in real-time; and
logic configured to provide the segment of the access point database previously generated and stored in the access point database.

13. The apparatus of claim 11, wherein logic configured to generate the segment of the access point database further comprises at least one of:
logic configured to reduce size of the segment of the access point database in accordance with density of access points in a geographical area the mobile client is located;
logic configured to reduce size of the segment of the access point database in accordance with building morphology of the geographical area the mobile client is located;
logic configured to reduce size of the segment of the access point database in accordance with popularity of one or more access points in the geographical area the mobile client is located; and
logic configured to reduce size of the segment of the access point database in accordance with maximum antenna range field of one or more access points in the geographical area the mobile client is located.

14. The apparatus of claim 13, wherein logic configured to reduce size of the segment of the access point database in accordance with density of access points comprises:
logic configured to determine a number of access points in the geographical area the mobile client is located; and
logic configured to reduce the number of access points based at least in part on a predetermined reduction factor.

15. The apparatus of claim 13, wherein logic configured to reduce size of the segment of the access point database in accordance with building morphology of the geographical area comprises at least one of:
logic configured to obtain density of buildings in the geographical area the mobile client is located and reduce the number of access points based at least in part on the density of buildings in the geographical area;
logic configured to obtain height of a building the mobile client is located and reduce the number of access points based at least in part on the height of the building; and
logic configured to obtain altitude information of a plurality of access points in the building and maintain access point distribution in accordance with the altitude information.

16. The apparatus of claim 13, wherein logic configured to reduce size of the segment of the access point database in accordance with popularity of one or more access points in the geographical area comprises:
logic configured to assign a score to each of the one or more access points in accordance with usage of the one or more access points by mobile clients in the geographical area; and
logic configured to maintain a number of access points based at least in part on the score of each of the one or more access points.

17. The apparatus of claim 13, wherein logic configured to reduce size of the segment of the access point database in accordance with maximum antenna range field of one or more access points in the geographical area comprises:
logic configured to reduce access points based at least in part on a predefined ratio of access points having large, medium, and small values of maximum antenna ranges.

18. The apparatus of claim 11, wherein logic configured to generate the segment of the access point database in accordance with at least an application requirement of the mobile client further comprises:
logic configured to reduce size of the segment of the access point database by adaptively controlling crowdsourcing data uploaded from mobile clients.

19. The apparatus of claim 18, wherein logic configured to adaptively control crowdsourcing data uploaded from mobile clients comprises:

logic configured to control amount of crowdsourcing data uploaded based at least in part on number of access points in a geographical area the mobile client is located.

20. The apparatus of claim 18, wherein logic configured to adaptively control crowdsourcing data uploaded from mobile clients further comprises:
    logic configured to control amount of crowdsourcing data uploaded based at least in part on maximum antenna ranges of access points in a geographical area the mobile client is located.

21. A computer program product comprising a non-transitory medium storing computer programs for execution by one or more computer systems, the computer program product comprising:
    code for receiving a request to access an access point database from a mobile client;
    code for generating a segment of the access point database in accordance with at least an application requirement of the mobile client, wherein the application requirement of the mobile client comprises a precision level requested by the mobile client and a cache level of the mobile client, and wherein the precision level requested by the mobile client and the cache level of the mobile client indicate capabilities of the mobile client in running applications based on the segment of the access point database; and
    code for providing the segment of the access point database to the mobile client.

22. The computer program product of claim 21, wherein code for generating the segment of the access point database comprises at least one of:
    code for generating the segment of the access point database in real-time; and
    code for providing the segment of the access point database previously generated and stored in the access point database.

23. The computer program product of claim 21, wherein code for generating the segment of the access point database further comprises at least one of:
    code for reducing size of the segment of the access point database in accordance with density of access points in a geographical area the mobile client is located;
    code for reducing size of the segment of the access point database in accordance with building morphology of the geographical area the mobile client is located;
    code for reducing size of the segment of the access point database in accordance with popularity of one or more access points in the geographical area the mobile client is located; and
    code for reducing size of the segment of the access point database in accordance with maximum antenna range field of one or more access points in the geographical area the mobile client is located.

24. The computer program product of claim 23, wherein code for reducing size of the segment of the access point database in accordance with density of access points comprises:
    code for determining a number of access points in the geographical area the mobile client is located; and
    code for reducing the number of access points based at least in part on a predetermined reduction factor.

25. The computer program product of claim 23, wherein code for reducing size of the segment of the access point database in accordance with building morphology of the geographical area comprises at least one of:
    code for obtaining density of buildings in the geographical area the mobile client is located and reducing the number of access points based at least in part on the density of buildings in the geographical area;
    code for obtaining height of a building the mobile client is located and reducing the number of access points based at least in part on the height of the building; and
    code for obtaining altitude information of a plurality of access points in the building and maintaining access point distribution in accordance with the altitude information.

26. The computer program product of claim 23, wherein code for reducing size of the segment of the access point database in accordance with popularity of one or more access points in the geographical area comprises:
    code for assigning a score to each of the one or more access points in accordance with usage of the one or more access points by mobile clients in the geographical area; and
    code for maintaining a number of access points based at least in part on the score of each of the one or more access points.

27. The computer program product of claim 23, wherein code for reducing size of the segment of the access point database in accordance with maximum antenna range field of one or more access points in the geographical area comprises:
    code for reducing access points based at least in part on a predefined ratio of access points having large, medium, and small values of maximum antenna ranges.

28. The computer program product of claim 21, wherein code for generating the segment of the access point database in accordance with at least an application requirement of the mobile client further comprises:
    code for reducing size of the segment of the access point database by adaptively controlling crowdsourcing data uploaded from mobile clients.

29. The computer program product of claim 28, wherein code for adaptively controlling crowdsourcing data uploaded from mobile clients comprises:
    code for controlling amount of crowdsourcing data uploaded based at least in part on number of access points in a geographical area the mobile client is located.

30. The computer program product of claim 28, wherein code for adaptively controlling crowdsourcing data uploaded from mobile clients further comprises:
    code for controlling amount of crowdsourcing data uploaded based at least in part on maximum antenna ranges of access points in a geographical area the mobile client is located.

31. A system for providing information of an access point database, comprising:
    means for receiving a request to access the access point database from a mobile client;
    means for generating a segment of the access point database in accordance with at least an application requirement of the mobile client, wherein the application requirement of the mobile client comprises a precision level requested by the mobile client and a cache level of the mobile client, and wherein the precision level requested by the mobile client and the cache level of the mobile client indicate capabilities of the mobile client in running applications based on the segment of the access point database; and
    means for providing the segment of the access point database to the mobile client.

32. The system of claim 31, wherein means for generating the segment of the access point database comprises at least one of:
  means for generating the segment of the access point database in real-time; and
  means for providing the segment of the access point database previously generated and stored in the access point database.

33. The system of claim 31, wherein means for generating the segment of the access point database further comprises at least one of:
  means for reducing size of the segment of the access point database in accordance with density of access points in a geographical area the mobile client is located;
  means for reducing size of the segment of the access point database in accordance with building morphology of the geographical area the mobile client is located;
  means for reducing size of the segment of the access point database in accordance with popularity of one or more access points in the geographical area the mobile client is located; and
  means for reducing size of the segment of the access point database in accordance with maximum antenna range field of one or more access points in the geographical area the mobile client is located.

34. The system of claim 31, wherein means for generating the segment of the access point database in accordance with at least an application requirement of the mobile client further comprises:
  means for reducing size of the segment of the access point database by adaptively controlling crowdsourcing data uploaded from mobile clients.

* * * * *